United States Patent Office 3,445,414
Patented May 20, 1969

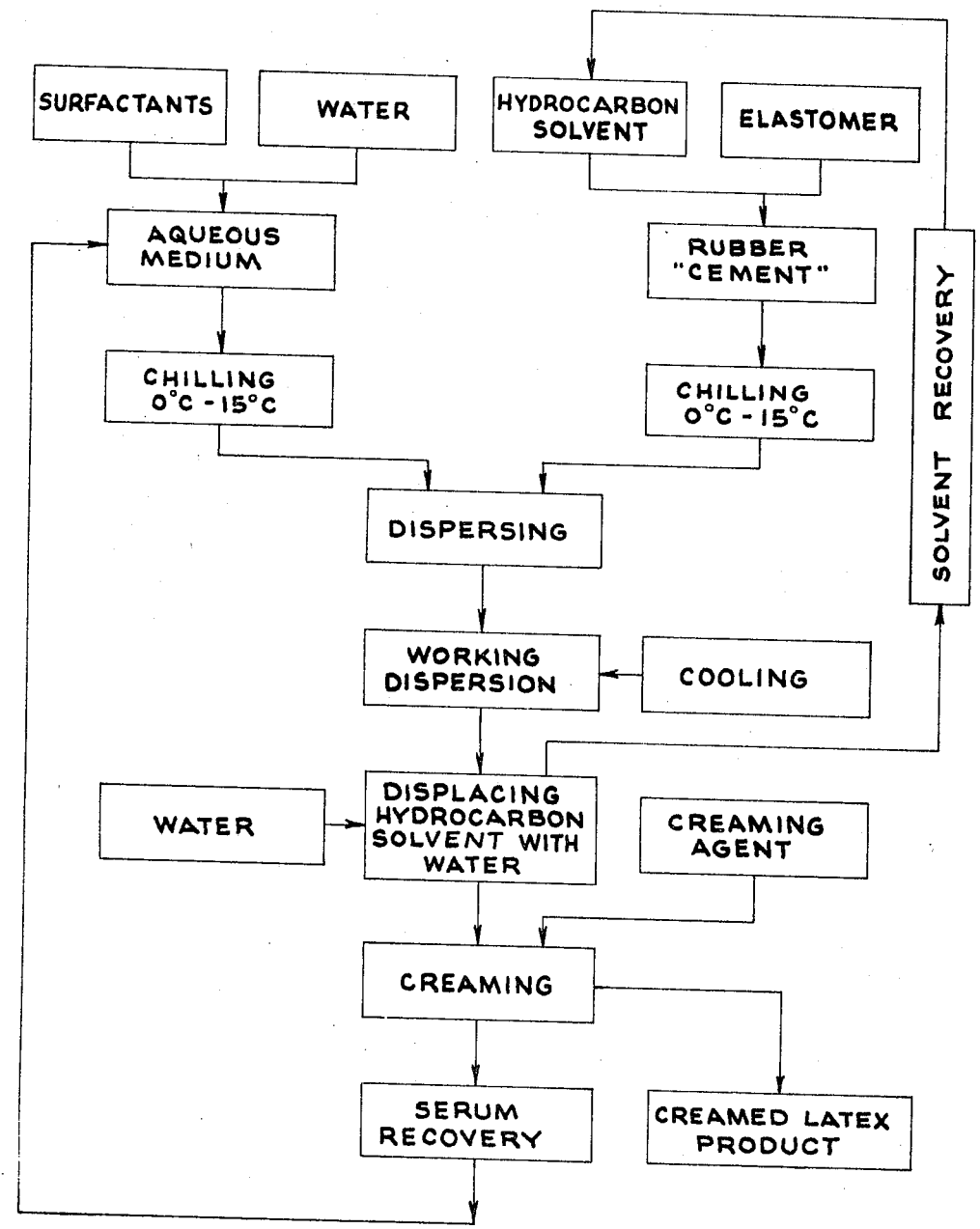

3,445,414
REPLACEMENT OF SOLVENT BY WATER IN PREPARATION OF ELASTOMER LATEX
Eakin M. Glymph, Cuyahoga Falls, and Henry G. Dawson, Akron, Ohio, assignors to The Firestone Tire & Rubber Company, Akron, Ohio, a corporation of Ohio
Continuation-in-part of application Ser. No. 358,901, Apr. 10, 1964. This application June 1, 1964, Ser. No. 373,130
Int. Cl. C08f 47/16, 47/18; C08d 5/00
U.S. Cl. 260—23.5          23 Claims This invention relates as indicated, to an improved latex, and to an improved method for making a dispersion of an elastomeric material in an aqueous medium.

This application is a continuation in part of our co-pending application Ser. No. 358,901, filed Apr. 10, 1964, now abandoned.

In the preparation of latices of elastomeric materials conventional procedure exemplified by that described in United States Patent No. 2,799,662, contemplates solution of the elastomer in a hydrocarbon solvent, and dispersion of this solution, or "cement," in the aqueous medium which contains dissolved therein one or more emulsifying agents. A principal problem with latices prepared by conventional procedure is that the emulsifying agents or surfactants are retained by the final latex to such a degree that the resulting concentrated latex is often too stable for practical use. In most cases, these latices must undergo coagulation whereby the small particles of disperse elastomer phase coalesce to form a continuous homogeneous phase. The presence of undue concentrations of the emulsifying agents from the latex formation step has been found to inhibit the ability of the disperse elastomer phase to form a continuous phase and yields unsatisfactory products.

One of the principal areas of use for latices of the type herein described is in the field of coating of conventional tire cord materials, for example rayon, nylon, Dacron, etc. The latices produced in accordance herewith are also useful in coating other fabric materials including natural and/or synthetic fibers, paper, and in the manufacture of coating compositions.

It has been found that in the process of making latices of elastomeric materials by dispersing a hydrocarbon solution of the elastomer in an aqueous medium containing an emulsifying composition, improved results may be obtained by displacing the hydrocarbon solvent with water just prior to the creaming step. By this procedure, the concentration of the emulsifier composition in the disperse phase is reduced to a point such that there is little or no interference with the coagulation procedure, and the individual elastomer particles are not so stably dispersed that they fail to coalesce in the desired manner.

This invention will be better understood by having reference to the annexed drawing which is a flow sheet setting forth the essential steps in forming a latex or dispersion of an elastomeric material in an aqueous medium and employing the solvent displacement procedure hereof.

The term "elastomer" as used herein contemplates those polymerized monomers, copolymers, interpolymers and terpolymers which in their normally usable form are characterized by elasticity such that when a test piece is elongated 100% and the stress relieved, it shall return to within 10% elongation within one minute.

Specific examples of elastomers include the natural and synthetic rubbers, and blends of various elastomers, e.g., poly(butadiene-styrene), poly(butadiene-acrylonitrile), poly(ethylene), atactic poly(propylene), poly(butadiene), poly(isobutylene), poly(isobutylene-isoprene), poly(ethylene-propylene), poly(ethylene-propylene-dicyclopentadiene), poly(vinyl chloride-vinyl acetate), poly(urethanes), neoprene, poly(vinyl chloride) plasticized, poly(isoprene), chlorosulfonated poly(ethylene) and other well known elastomeric materials, all of which are soluble in hydrocarbon (or halogenated hydrocarbon) solvents.

Briefly stated, the present invention is in a process for forming an oil-in-water type latex dispersion from a solid elastomer and water including the steps of emulsifying a water immiscible solution of said elastomer in an aqueous solution containing an emulsifying composition for said elastomer solution, the improvement which comprises displacing substantially all of the elastomer solvent with the continuous phase, e.g., water, prior to creaming the dispersion.

As will be seen from the annexed flow sheet, an initial step involves the formation of an aqueous solution including a conventional emulsifier system. One or more emulsifying agents may be used, and it is common practice to employ two, three or more such emulsifiers. Generally speaking, there is present in the emulsifier composition at least one nonionic emulsifier and at least one anionic emulsifier one of which is preferentially hydrocarbon soluble and one of which is preferentially water soluble. Examples of emulsifiers soluble in hydrocarbon are the anionic alkali metal petroleum sulphonates having 16 to 22 carbon atoms arranged in an alkyl-aryl structure. Examples of nonionic emulsifiers soluble in water are the polyethoxylated alkyl phenols, e.g. ethoxylated nonyl phenol having 8–10 ethoxy groups (Triton X–100). The total emulsifier content in the aqueous solution generally ranges from about 10% to about 50% by weight of the dispersed polymer phase. Additional emulsifying agents of the anionic type include the alkali metal soaps, for example the sodium, potassium and lithium soaps of high molecular weight fatty acids, such as oleic acid, stearic acid, ricinoleic acid, dehydrated castor oil acids, and the like. Particularly suitable anionic emulsifying agents for use in accordance herewith are the alkali metal (sodium, potassium, lithium) oleates, e.g., potassium oleate. Combinations of anionic emulsifying agents are conveniently used in forming the emulsifying compositions hereof. Thus, there may be used in addition to those previously stated, a third emulsifying agent which is an alkali metal soap of a sulphated high molecular weight fatty alcohol, e.g., lauryl, cetyl, myristyl, palmityl, oleyl, stearyl, alcohols, or mixtures thereof, e.g., "Aquarex-D" which is a sodium salt of sulphated mixed lauryl and myristyl alcohols. As indicated, the range of concentration of the emulsifying agents will vary depending upon the strength of the emulsifying agents and is generally within the range of from 10% to 50% with intermediate amounts being preferred, for example from 25% to 35% and specifically about 30% by weight of emulsifying agents. A particularly suitable emulsifier composition includes only one type of emulsifier, e.g., anionic, or soap type; for example, equal parts of sodium oleate and sodium soap of rosin acid in a low range of concentration such as 10% to 20% by weight of the dispersed phase. A concentration of 15% by weight is especially satisfactory. Also as above indicated, a single emulsifier is all that is necessary, e.g., sodium oleate, or sodium soap of rosin acids, sodium abietate, etc.

The next step, which is not necessarily performed in sequence with the preceding step, is the formation of a solution of the desired elastomer, or blend of elastomers, in a water-immiscible solvent to form a so-called "rubber cement." The solvent used for this purpose is a conventional hydrocarbon-type solvent and may contain from 4 to 10 carbon atoms. Accordingly, there may be used as the solvent material, butenes, pentane, pentenes, isopentane, hexane, cyclohexane, cyclopentane, heptane, octane, 2-ethyl hexane, diisobutylene, trimethyl pentane, octene-1, nonane, decane, benzene, styrene, toluene, chloroform, ethylene dichloride, trichloroethylene, bornylene, commercial mixtures of these hydrocarbons, for example mineral spirits, and especially prepared mixtures of any two or more of the foregoing solvents. For nitrile rubbers, water-immiscible oxygen-containing solvents such as those of the ketone type may be used, although hydrocarbon-type solvents are preferred. The concentration of the elastomer in the hydrocarbon solvent is generally in the range of from about 5% to about 10% by weight. The concentration may be varied up or down from the foregoing limits depending upon the viscosity of the resulting "cement." The objective is to prepare a cement which will flow at the reduced temperatures hereinafter described. Normally a 5% to 10% concentration will be satisfactory.

The elastomer which is used to form the cement with the hydrocarbon solvent should desirably be free of any gel particles and must, of course, be soluble in the hydrocarbon solvent. In general, those elastomers of generally low molecular weight or low Mooney at 212° F. are used. Generally speaking, those materials having Mooneys in the range of 30 to 100, ML–4 Mooney at 212° F. are preferred. Especially satisfactory results have been obtained with those materials which have Mooneys in the range of from 40 to 60. The "Mooney number" is a standard measure employed in the rubber industry for measuring the relative molecular weight of the polymer.

After each of the solutions has been formed in accordance with the preceding instructions, each solution is chilled to a temperature of from about 0° to about 15° C., preferably about 10° C. As above indicated, the viscosity of the "rubber cement" should be such at this reduced temperature that it can be poured into the chilled aqueous emulsifier composition solution.

As is true in the case of the formation of any emulsifier composition, the particle size of the disperse phase is many times dependent upon the amount of work which is done upon the emulsion. In the present case, the objective is to form an oil-in-water type emulsion by admixing the hydrocarbon solution of the elastomer into the aqueous solution of the emulsifier composition while imparting a considerable amount of energy to the system. Alternatively, fatty acid, e.g., oleic acid, may be dissolved in the hydrocarbon solution and an alkali e.g. KOH in the water and the resulting solutions mixed. Very satisfactory results have been secured by forming the dispersion with the aid of an Eppenbach mixer. This machine, or its equilavent, is capable of imparting sufficient energy to the system to provide a very fine particle size which, as will hereinafter be more particularly explained is determined by "mass average particle size." The "rubber cement"—hydrocarbon solution is slowly added to the aqueous solution of the emulsifier composition in an Eppenbach machine, until the entire amount of the "rubber cement" has been added. Thereafter, the dispersion is worked for a substantial period, for example from 15 to 60 minutes in the Eppenbach machine along with cooling. As work is done on the dispersion for the purpose of reducing the ultimate particle size, the temperature tends to rise. Accordingly, it is desirable to continue active chilling of the composition during its treatment in the Eppenbach machine so as to maintain the temperature within the desired range. The chilling of the latex during the agitation period following the completion of the addition of the hydrocarbon solution of the elastomer insures a high degree of emulsification and also confers upon the dispersion the property of preventing excessive frothing due to volatilization of the solvent as a result of the heat build-up from the work being done on the system.

In general, the particle size, which is conveniently expressed in terms of the mass average particle size of the latex, as it is withdrawn from the Eppenbach machine will be less than about 10,000 A. and is at this time in the range from about 2,000 to 8,000 Angstroms.

Up to this point, the procedure which has been followed is substantially the same as that which is known and used for dispersing butyl rubber to form a butyl rubber latex. Further details and additional examples of the process to this point will be found in the United States Patent No. 2,799,662, dated July 16, 1957, the disclosure of which is hereby incorporated by reference thereto.

It should be pointed out that where the lower boiling point hydrocarbon solvents are used, pressure may be employed, and the Eppenbach machine is adapable to being operated under pressure conditions. This will prevent undue loss of the hydrocarbon solvent by virtue of evaporation due to the amount of work which is being performed upon the dispersion.

The dispersion which has been withdrawn from the Eppenbach machine is now subjected to the novel treatment of the present invention by which the hydrocarbon solvent is exchanged for water. In the normal procedure for emulsifying a hydrocarbon soluble elastomer into an aqueous medium, the procedure has been to remove the solvent without any effort toward replacing that solvent with water. The result has been that the concentration of the emulsifying agent or composition which remains intimately associated with the disperse phase has been so high as to impair the characteristics of the creamed latex for the ultimate purposes to which it is to be put. It has now been found that by replacing the solvent as it is removed from the system with water, and depending upon the preferential solubility of the emulsifying agents for the aqueous medium, the concentration of the emusifier composition in the aqueous medium is relatively increased, and the concentration of such emulsifying composition in the disperse phase is relatively decreased. In this manner, the final creamed latex, which is a concentrated form of the latex, is not too stable for practical use. As previously indicated, the skimmed aqueous fraction may be used again as the emulsifier system in a subsequent batch. Also, the solvent can be recovered and recycled to the process.

As previously indicated, the boiling point of the hydrocarbon solvent used in forming the "rubber cement" should be less than the boiling point of water. A preferred material for this purpose is a hexane which has a boiling point in the range of 50° C. to 70° C., for example n-hexane boils at 68.7° C. at 760 mm. pressure.

As the hydrocarbon solvent is removed by evaporation, preferably under reduced pressure, e.g., 26″ of mercury, the volume of the latex dispersion is maintained substantially constant by replacement of the volume loss due to evaporation of the solvent together with such minor amounts of water as are concurrently lost, with water. Atmospheric pressure may be used if desired. The leaching effect of the added aqueous medium which becomes a part of the continuous aqueous phase results in a reduction in the concentration of the emulsifying agent in the disperse phase.

After the novel solvent displacement step the balance of the procedure for producing a concentrated latex is substantially the same as that which has been previously followed in the formation of creamed butyl latices. The material which results from the evaporation of the hydrocarbon solvent simultaneously with a replacement of substantially the entire lost volume by an aqueous medium contains solids to the extent of from about 3% to about 8% by weight of the disperse phase. The creaming operation is carried out in the usual fashion by adding a creaming, or protective, or stabilizing agent, such as, ammonium alginate, gum arabic, carob beam flour, casein, gum tragacanth, karaya gum, starch, etc., to the aqueous dispersion and waiting for the resulting settlement and separation of the latex phase from the surplus aqueous phase. The ammonium alginate apparently forms a protective coating for the particles of the now solvent free elastomer in an aqueous system, and the ammonium alginate does not interfere with the production of a homogeneous elastomer composition once the continuous phase is removed, as by evaporation. A bactericide such as sodium pentachlorophenate to inhibit bacterial growth in storage may be added, if desired.

The present invention will be illustrated by the following example using an ethylene-propylene-dicyclopentadiene terpolymer, for example a 50:50:3 ratio of monomers on a molar basis, otherwise known as EPT. It will be understood, however, that in place of the ethylene-propylene terpolymer of the present illustration, any other elastomeric material whether naturally occurring or synthetic such as those listed above may be substituted in whole or in part for the EPT material. The exact composition of the elastomer is not critical to the suitability for use in accordance with this invention.

500 grams of ethylene/propylene/dicyclopentadiene terpolymer (EPT) were dissolved in 10.1 pounds of commercial hexane to give a total of 4,590 grams of "rubber cement." 50 grams of Triton X–100, 250 grams of 20% Aquarex-D aqueous solution, 250 grams of 20% potassium oleate aqueous solution were dissolved in 5,000 grams of water. This material had added to it in an Eppenbach machine the "rubber cement," and the two formed into an emulsion. Action in the Eppenbach machine was continued for a period of 30 minutes following the termination of the addition of the "rubber cement" to the aqueous emulsifier solution. Thereafter, the emulsion was submitted to solvent removal in a disc type evaporator, and the volume was held at 3 gallons with water while the solvent was removed by evaporation at an ambient temperature surrounding the exposed portion of the disc which may range from room temperature to a temperature in excess of the boiling point of the solvent at the ambient pressure, e.g., normal atmospheric pressure. 9,950 grams of desolvenated latex were recovered which contained 500 grams of rubber. To this 954 grams of a creaming agent consisting of 1.0% ammonium alginate in water solution were added together with an additional 300 grams of water. The separation yielded 10,020 grams of skim or serum, and 1,130 grams of cream. On concentration, there were obtained 935 grams of concentrated latex having a total solids of 45.4% equivalent to 425 grams of dry rubber. This amounted to 85% recovery.

Creaming or concentrating of the latex can be effected spontaneously by allowing the latex dispersion to stand, or by centrifuging. The latter is preferred. When centrifuging is employed, it is not necessary to utilize a creaming agent.

In the course of this example, the aqueous solution was chilled in a sink with ice water and then the cement emulsified in an Eppenbach machine by pouring slowly into the chilled aqueous solution. The solution was kept cool for several hours the whole remaining at about 13° C. During this period, the highly volatile fraction was removed and there was little subsequent foaming when transferred to the concentrator.

The serum recovered in the creaming step may be re-used in the aqueous phase of a subsequent batch, and the hydrocarbon solvent condensed and recycled to the "rubber cement" formation step. The recovered serum contains approximately 90% of the emulsifier agents originally used and accordingly it is economically desirable to recover these to as great an extent as possible.

The foregoing procedure resulted in a creamed latex which evidenced none of the problems attendant latices which were characterized by the presence of too high a concentration of the emulsifying agents. Such latices tend to be too stable when the concentration of the emusifying agents is too high. In the example above shown, the concentration of the emulsifying agents was sufficiently reduced that the latex was completely satisfactory for all intended purposes. The latex with the reduced stabilizer content possesses improved gelling characteristics particularly in respect of the sharpness of gelation. It also permits a better rubber to nonrubber ratio and the preparation of latives of high solids content, e.g., the 60% to 65% solids used in making foam rubber. Shelf stability is improved also. Polyphosphates may be added to the improved latices produced in accordance with this invention to increase resistance to gelation or coagulation and permit higher than usual loading with fillers or pigments. An example of such a polyphosphate is sodium tripolyphosphate.

Instead of the ethylene-propylene rubber of the preceding example, there may also be used an ethylene-propylene terpolymer in which the third monomer is a material such as cyclopentadiene, norbornene, or the like. Likewise, there may be substituted in whole or in part for the elastomers of the preceding example any of the elastomers previously mentioned.

There has thus been provided an improved process for the formation of aqueous dispersions of elastomers from a hydrocarbon solvent solution of the elastomer. This process is characterized by utilizing a chilling step in the course of forming the emulsion so that the temperature increase occasioned by work performed on the solution by the emulsifying machine is insufficient to volatilize the hydrocarbon solvent. More particularly, the process is characterized by the displacement of the solvent by water prior to the creaming step so that the concentration of the emulsifying agents remaining in the disperse phase, i.e., the "oil" phase of the oil-in-water emulsion is sufficiently reduced that the properties of the rubber material are not adversely affected thereby when the latex is put to its ultimate use such as a paper treating material, or a coating composition. In all cases, the resulting creamed latex of the present invention may be used in the normal manner for using such creamed latices, all of which are familiar to those skilled in the art.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. In a process for emulsifying a hydrocarbon solvent soluble elastomer, including the steps of:
   (a) forming an aqueous solution of an emulsifying composition including at least one hydrocarbon soluble emulsifier, the total emulsifier composition content being in the range of from 10% to 50% by weight based on the weight of the elastomer,
   (b) forming a hydrocarbon solution of a hydrocarbon soluble elastomer, said hydrocarbon containing from 4 to 10 carbon atoms, and the solids content of the solution being from about 5% to about 10% by weight,
   (c) chilling each of said solutions to a temperature of from about 0° C. to about 15° C.,
   (d) adding said elastomer solution to said aqueous solution which vigorously agitating the resulting dispersion,
   (e) continuing to cool the resulting dispersion to maintain the temperature below the boiling point of the hydrocarbon solvent while applying a shearing force to the dispersion until the disperse phase has a mass average particle size less than about 10,000 A., and
   (f) creaming said dispersion to form a concentrated latex, the improvement which comprises:
   (g) exchanging water for the hydrocarbon solvent under conditions of temperature and pressure sufficient to vaporize the hydrocarbon solvent without substantially removing water and simultaneously adding a solvent replacing volume of water to form a hydrocarbon depleted dispersion prior to creaming said dispersion.

2. In a process for emulsifying a hydrocarbon solvent soluble elastomer including the steps of:
 (a) forming an aqueous solution of an emulsifier composition including at least one nonionic emulsifier and at least one anionic emulsifier, the total emulsifier content ranging from 10% to 50% by weight based on the weight of the elastomer,
 (b) forming a hydrocarbon solution of hydrocarbon soluble elastomer having a Mooney value at 212° F. of from 40–100 in which the hydrocarbon solvent contains from 4 to 10 carbon atoms, and the solids contents of the solution is from about 5% to about 10% by weight,
 (c) chilling each of said solutions to a temperature of from 10° C. to 15° C.,
 (d) adding said elastomer solution to said aqueous solution while vigorously agitating the resulting dispersion,
 (e) continuing to chill the resulting dispersion to maintain the temperature below the boiling point of the hydrocarbon solvent while applying a shearing force to the dispersion until the disperse phase has a mass average particle size less than about 10,000 A., and
 (f) creaming and dispersion to form a concentrated latex,
the improvement which comprises:
 (g) exchanging water for the hydrocarbon solvent under conditions of temperature and pressure sufficient to vaporize the hydrocarbon solvent without substantially removing water and simutaneously adding a solvent replacing volume of water to form a hydrocarbon depleted dispersion prior to creaming said dispersion.

3. An improved process in accordance with claim 2 wherein the anionic emulsifying agent is an alkali metal soap of a high molecular weight fatty acid containing from 16 to 20 carbon atoms and the nonionic emulsifier is a water soluble ethoxylated alkyl substituted phenol wherein the alkyl group contains from 8 to 10 carbon atoms and the number of ethoxy groups is in the range of from 8 to 10.

4. An improved process in accordance with claim 3 wherein the nonionic emulsifier is ethoxylated nonyl phenol containing from 8 to 10 ethoxy groups and the anionic emulsifier is potassium oleate.

5. An improved process in accordance with claim 2 in which the emulsifier composition consists of equal parts of ethoxylated nonyl phenol containing 8 to 10 ethoxy groups, potassium oleate, and a mixture of sodium salts of sulphated mixer higher fatty alcohols including lauryl and myristyl alcohols, and the total emulsifier content in said aqueous solution is 30% by weight.

6. An improved process in accordance with claim 2 in which the hydrocarbon solvent is a hexane composition having a boiling point in the range of from about 40° to about 70° C.

7. An improved process in accordance with claim 6 in which the hydrocarbon solvent is n-hexane.

8. An improved process in accordance with claim 2 in which the hydrocarbon soluble elastomer is ethylene-propylene rubber.

9. An improved process in accordance with claim 2 in which the hydrocarbon soluble elastomer is an ethylene-propylene terpolymer.

10. An improved process in accordance with claim 9 in which the ethylene-propylene terpolymer of ethylene, propylene and dicyclopentadiene.

11. A process for emulsifying a terpolymer formed from ethylene, propylene, and a diene monomer which includes the steps of:
 (a) forming an aqueous solution of equal parts of:
  (1) potassium oleate,
  (2) ethoxylated nonyl phenol containing 8 to 10 ethoxy groups,
  (3) a mixture of sodium soap of sulphated mixed fatty alcohols including lauryl and myristyl alcohols, the total concentration of components (1), (2) and (3) being approximately 30% by weight of dispersed polymer,
 (b) forming a hexane solution of ethylene-propylene terpolymer, the solids content of said hydrocarbon being in the range of from about 5% to 10% by weight,
 (c) chilling each of said solutions to a temperature of from 10° C. to 15° C.,
 (d) adding said hydrocarbon solution to said aqueous solution while vigorously agitating the resulting dispersion,
 (e) continuing to chill the resulting dispersion to maintain the temperature below the boiling point of the hydrocarbon solvent while applying a shearing force to the dispersion until the disperse phase has a mass average particle size within the range of from about 6,000 to about 8,000 Angstroms,
 (f) exchanging water for the hexane under conditions of temperature and pressure sufficient to vaporize the hexane without substantially removing water and simultaneously adding a solvent replacing volume of water to maintain the volume of the dispersion substantially constant and to form a hydrocarbon depleted dispersion,
 (g) recovering the hexane and recycling it to step (b) above,
 (h) creaming said dispersion to form a concentrated latex, and
 (i) recovering the emulsifier composition containing serum from said creaming step and returning it to step (a) above.

12. The product produced in accordance with the process of claim 11.

13. In a process for forming an oil-in-water type latex dispersion from a solid water insoluble elastomer and water including the steps of emulsifying a water immiscible solution of said elastomer in an aqueous solution including an emulsifying agent for said elastomer solution to form a latex, removing the elastomer solvent and concentrating the latex, the improvement which comprises displacing substantially all the elastomer solvent with water prior to concentrating the latex.

14. The product produced in accordance with the improved process of claim 13.

15. In a process for forming an oil-in-water type latex dispersion from a solid water insoluble elastomer and water including the steps of emulsifying a water immiscible solution of said elastomer in an aqueous solution including an emulsifying agent for said elastomer solution to form a latex, removing the elastomer solvent, and concentrating the latex, the improvement which comprises the steps of displacing substantially all of the elastomer solvent with water prior to concentrating the latex, concentrating the elastomer solvent depleted latex, separating a serum including substantially all of said emulsifying agent, and recycling said serum to said emulsification step.

16. In a process for forming an oil-in-water type latex dispersion from a solid hydrocarbon solvent soluble elastomer and water including the steps of emulsifying a hydrocarbon solution of said elastomer in an aqueous solution including an emulsifying agent for said elastomer solution to form a latex, removing the hydrocarbon solvent, and creaming the latex, the improvement which comprises the steps of displacing substantially all of the hydrocarbon with water prior to creaming the latex, creaming the hydrocarbon solvent depleted latex, separating a serum including substantially all of said emulsifying agent, recycling said serum to said emulsification step and recovering said hydrocarbon solvent and recycling the same to form said hydrocarbon solution of said elastomer.

17. In a process for forming an oil-in-water type latex dispersion from a solid hydrocarbon solvent soluble elastomer and water including the steps of emulsifying a hydrocarbon solution of said elastomer in an aqueous solution including an emulsifying agent for said elastomer solution to form a latex, removing the hydrocarbon solvent, and concentrating the latex, the improvement which comprises the steps of displacing substantially all of the hydrocarbon with water prior to concentrating the latex, concentrating the hydrocarbon solvent depleted latex, separating a serum including substantially all of said emulsifying agent, recycling said serum to said emulsification step and recovering said hydrocarbon solvent and recycling the same to form said hydrocarbon solution of said elastomer.

18. In a process for forming an oil-in-water type latex dispersion from a solid hydrocarbon solvent soluble elastomer and water including the steps of emulsifying a hydrocarbon solution of said elastomer in an aqueous solution including an emulsifying agent for said elastomer solution to form a latex, removing the hydrocarbon solvent, and concentrating the latex, the improvement which comprises the steps of displacing substantially all of the hydrocarbon with water prior to concentrating the latex, centrifuging the hydrocarbon solvent depleted latex to concentrate it, separating a serum including substantially all of said emulsifying agent, recycling said serum to said emulsification step and recovering said hydrocarbon solvent and recycling the same to form said hydrocarbon solution of said elastomer.

19. In a process in accordance with claim 18 wherein said centrifuging step is performed in the absence of a creaming agent.

20. In a process for forming an oil-in-water type latex dispersion from a solid hydrocarbon solvent soluble elastomer and water including the steps of emulsifying a hydrocarbon solution of said elastomer in an aqueous solution including an anionic emulsifying agent for said elastomer solution to form a latex, removing the hydrocarbon solvent, and creaming the latex, the improvement which comprises the steps of displacing substantially all of the hydrocarbon with water prior to creaming the latex, creaming the hydrocarbon solvent depleted latex, separating a serum including substantially all of said emulsifying agent, recycling said serum to said emulsification step and recovering said hydrocarbon solvent and recycling the same to form said hydrocarbon solution of said elastomer.

21. In a process in accordance with claim 20 wherein said anionic emulsifying agent is an alkali metal soap present in an amount ranging from 10% to 20% by weight of the disperse phase.

22. In a process in accordance with claim 21 wherein the anionic emulsifying agent includes sodium oleate.

23. In a process in accordance with claim 22 wherein the anionic emulsifying agent is a mixture of sodium oleate and sodium soap of rosin acids.

References Cited
UNITED STATES PATENTS

| | | |
|---|---|---|
| 2,595,797 | 5/1952 | Leyonmark et al. |
| 2,799,662 | 7/1957 | Ernst et al. |
| 2,849,427 | 8/1958 | Kennedy et al. |
| 2,897,167 | 7/1959 | Dreisback et al. |
| 2,936,295 | 5/1960 | Brodkey et al. |
| 2,944,038 | 7/1960 | Hunter et al. |
| 3,000,866 | 9/1961 | Tarney. |
| 3,012,016 | 12/1961 | Kirk, et al. |
| 3,215,649 | 11/1965 | Preiss et al. _____ 260—17 |
| 3,238,173 | 3/1966 | Bailey et al. _____ 260—29.7 |
| 3,244,660 | 4/1966 | Herold. |
| 3,250,737 | 5/1966 | Halper et al. _____ 260—23.7 |
| 3,258,440 | 6/1966 | Burleigh et al. |
| 3,272,767 | 9/1966 | Howland et al. |
| 3,285,869 | 11/1966 | Ronay et al. _____ 260—23.7 |
| 3,287,301 | 11/1966 | Fysh et al. _____ 260—23.7 |
| 3,301,810 | 1/1967 | Hunter et al. _____ 260—29.7 |

OTHER REFERENCES

Kirk et al.: "Encyclopedia of Chemical Technology," vol. 11 (1953), pp. 821 and 822.

DONALD E. CZAJA, *Primary Examiner.*

R. A. WHITE, *Assistant Examiner.*

U.S. Cl. X.R.

260—23, 23.7, 27, 29.6, 29.7, 34.2

PO-1050
(5/69)

UNITED STATES PATENT OFFICE
CERTIFICATE OF CORRECTION

Patent No. 3,445,414     Dated May 20, 1969

Inventor(s) Eakin M. Glymph and Henry G. Dawson

It is certified that error appears in the above-identified patent and that said Letters Patent are hereby corrected as shown below:

Col. 2, line 1, "poly(vinyl chloride-vinvyl acetate)," should read
--poly(vinyl chloride-vinyl acetate),--

Col. 4, line 68, "beam" should read --bean--

Col. 6, line 59, "which" should read --while--

Col. 7, line 24, "and" should read --said--

SIGNED AND
SEALED

MAR 3 - 1970

(SEAL)
Attest:

Edward M. Fletcher, Jr.
Attesting Officer

WILLIAM E. SCHUYLER, JR.
Commissioner of Patents